US010921231B2

(12) United States Patent
Stirling

(10) Patent No.: US 10,921,231 B2
(45) Date of Patent: Feb. 16, 2021

(54) SYSTEM AND METHOD FOR DETERMINING CONCENTRATION

(71) Applicant: FloLevel Technologies Pty Ltd, Nunawading (AU)

(72) Inventor: Robert Sidney Stirling, Surrey Hills (AU)

(73) Assignee: FloLevel Technologies Pty Ltd, Nunawading (AU)

( * ) Notice: Subject to any disclaimer, the term of this patent is extended or adjusted under 35 U.S.C. 154(b) by 145 days.

(21) Appl. No.: 16/004,038

(22) Filed: Jun. 8, 2018

(65) Prior Publication Data

US 2018/0356326 A1 Dec. 13, 2018

Related U.S. Application Data

(63) Continuation of application No. PCT/AU2016/000394, filed on Dec. 9, 2016.

(30) Foreign Application Priority Data

Dec. 9, 2015 (AU) .................................. 2015905092

(51) Int. Cl.
*G01N 15/06* (2006.01)
*G01N 29/032* (2006.01)
(Continued)

(52) U.S. Cl.
CPC ............. *G01N 15/06* (2013.01); *B01D 43/00* (2013.01); *B03D 1/028* (2013.01); *G01N 29/032* (2013.01);
(Continued)

(58) Field of Classification Search
CPC .................................................... G01N 15/06
See application file for complete search history.

(56) References Cited

U.S. PATENT DOCUMENTS 5,563,845 A 10/1996 Walsh
5,569,844 A * 10/1996 Sowerby ................ G01N 15/02
378/53
(Continued)

FOREIGN PATENT DOCUMENTS

CN 101035681 9/2007
CN 104749077 7/2015
(Continued)

OTHER PUBLICATIONS

Stolojanu, V. et al., "Characterization of slurry systems by ultrasonic techniques", Chemical Engineering Journal 84 (2001), p. 215-222.
(Continued)

*Primary Examiner* — Paul M. West
*Assistant Examiner* — Mark A Shabman
(74) *Attorney, Agent, or Firm* — Gregory A. Walters; Walters IP Law

(57) ABSTRACT

An apparatus to determine the concentration of a target component in a mixture, the apparatus including at least one acoustic transducer located within the mixture, a controller generating a signal for the at least one acoustic transducer that's generating an acoustic signal in the mixture and transmitting same toward the target component within the mixture, wherein the acoustic signal is generated with a known power level, and a processor for measuring change in the power level of the at least one acoustic transducer as the acoustic signal is transmitted through the mixture, wherein the magnitude of the change in signal power determines the concentration of the target component in the mixture.

20 Claims, 5 Drawing Sheets

(51) Int. Cl.
  *B03D 1/02* (2006.01)
  *B01D 43/00* (2006.01)
  *G01N 29/14* (2006.01)
  *G01N 15/00* (2006.01)

(52) U.S. Cl.
  CPC ..... *G01N 29/14* (2013.01); *G01N 2015/0053* (2013.01); *G01N 2291/018* (2013.01); *G01N 2291/02416* (2013.01); *G01N 2291/02433* (2013.01); *G01N 2291/02809* (2013.01); *G01N 2291/106* (2013.01)

(56) References Cited

U.S. PATENT DOCUMENTS

| | | | |
|---|---|---|---|
| 6,581,459 B1 | 6/2003 | Lichtenfels, II | |
| 6,837,098 B2* | 1/2005 | Gysling | G01F 1/7082 73/61.47 |
| 7,426,852 B1* | 9/2008 | Rothman | G01N 29/024 702/54 |
| 7,503,217 B2* | 3/2009 | Johansen | E21B 47/101 73/599 |
| 2005/0055136 A1 | 3/2005 | Hofmann et al. | |
| 2005/0150275 A1 | 7/2005 | Panetta et al. | |
| 2006/0178581 A1* | 8/2006 | Africk | G01N 15/02 600/440 |
| 2006/0192679 A1 | 8/2006 | Buckley | |
| 2010/0257931 A1 | 10/2010 | Partington et al. | |
| 2015/0377683 A1 | 12/2015 | Stirling et al. | |

FOREIGN PATENT DOCUMENTS

| | | | |
|---|---|---|---|
| EP | 0853236 | 7/1998 | |
| WO | 2007142933 | 12/2007 | |
| WO | WO-2014117213 A1 * | 8/2014 | G01F 23/296 |

OTHER PUBLICATIONS

PCT International Search Report for PCT International Application No. PCT/AU2016/000394, dated Feb. 28, 2017, 5 pages.
PCT Written Opinion for PCT International Application No. PCT/AU2016/000394, dated Feb. 28, 2017, 4 pages.
PCT International Preliminary Report on Patentability for PCT International Application No. PCT/AU2016/000394, dated Jun. 12, 2018, 5 pages.
Lee, John H. et al., "Ultrasound Image-based Absolute Concentration Measurement Technique for Materials with Low Scatter Concentration", IEEE International Ultrasonics Symposium Proceedings (2015), 4 pages.
Supplementary European Search Report for European Patent Application No. 16871812.0, dated Jul. 25, 2019, 10 pages.
Examination Report for Chilean Application No. 201801527, dated Jul. 17, 2019, 14 pages.
PCT International Search Report for PCT International Application No. PCT/AU2014/000055, dated Apr. 17, 2014, 3 pages.
Australian Examination Report No. 1 for Australian Patent Application 2014213002, dated Feb. 10, 2017, 3 pages.
European Extended Search Report for European Patent Application 14746730.2, dated Oct. 20, 2016, 8 pages.
Mexican Examination Report for Mexican Patent Application MX/a/2015/009771, dated Apr. 5, 2017, 3 pages.
Resolucion De Notificacion Del Informe Pericial (Ley Nueva), Tip / Nro Solicitud: Patente de Invencion: PCT 2015-002129, dated May 8, 2017, 6 pages.
Chinese Search Report and Office Action for Chinese Patent Application 201480018164.5, dated Apr. 26, 2017, 13 pages.
Australian Examination Report No. 2 for Australian Patent Application 2014213002, dated Feb. 7, 2018, 3 pages.
Australian Examination Report No. 1 for Australian Patent Application 2018201001, dated Jan. 9, 2019, 3 pages.
Canadian Examination Report for Canadian Patent Application 2899516, dated Jan. 16, 2020, 4 pages.
Mexican Examination Report for Mexican Patent Application MX/a/2017/014983, dated Nov. 22, 2019, 4 pages.
Peruvian Examination Report for Peruvian Patent Application 002539-2019/DIN, dated Jul. 22, 2019, 9 pages.
United States Office Action for U.S. Appl. No. 14/746,239, dated Jul. 5, 2017, 12 pages.
United States Office Action for U.S. Appl. No. 14/746,239, dated May 17, 2018, 13 pages.
United States Office Action for U.S. Appl. No. 14/746,239, dated Apr. 5, 2019, 13 pages.
United States Office Action for U.S. Appl. No. 14/746,239, dated Jan. 24, 2020, 12 pages.

* cited by examiner

SYSTEM AND METHOD FOR DETERMINING CONCENTRATION

CROSS-REFERENCE TO RELATED APPLICATIONS

This application is a continuation of International Application No. PCT/AU2016/000394, filed Dec. 9, 2016, and claims benefit of priority of Australian Patent Application No. 2015905092 filed Dec. 9, 2015. The disclosures of the prior applications are considered part of the disclosure of this application and are herein incorporated by reference.

FIELD OF THE INVENTION

The present invention relates to a system and method that determines the concentration of a target component in a mixture such as the concentration of suspended solids in a mixture. The invention may find particular use in industries including mining, waste water treatment and pulp and paper manufacturing in which the concentration of suspended solids in a mixture at various processing stages is often important to ensure processing efficiency.

BACKGROUND OF THE INVENTION

Whilst the system and method of the present invention may find use in a number of industries, the background of the invention will be described with reference to the mining industry and in particular, the froth flotation process. Monitoring and measurement of the suspended solids concentration at various stages during the processing of ore is a critical factor in material recovery and overall process efficiency.

Mining involves the extraction of valuable minerals, or other geological materials, from the earth and a major aspect of any mining process is the maximization of the recovery of valuable minerals and metals from low grade ore at the lowest possible cost. It is recognized that the selective separation of minerals renders the processing of mixed ores economically feasible. Froth flotation is a process that has been used since the mid-20th century as a recovery means of valuable materials within excavated ore that involves selectively separating materials on the basis of differences in their hydrophobicity—that is, separating hydrophobic materials from hydrophilic materials.

The froth flotation process is currently used in mining to separate a wide range of sulphide, carbonates and oxides which are subjected to further refinement to extract and separate metals such as iron, nickel, copper and lead. Froth flotation is also used during the mining of silver and gold in which the recovery of such metals from low grade ore is critical to the economic feasibility of gold and silver processing.

Mineral processing involves the stage-wise liberation and flotation of the valuable target minerals and metals from the gangue (waste material) in the excavated ore. Liberation is achieved by mechanical means of crushing and grinding, known as comminution, after which the liberated ore (of particle sizes typically less than about 3 mm) is subjected to various flotation stages known as Roughing, Cleaning and Scavenging in which each flotation stage involves the recovery of progressively finer material.

As part of the froth flotation process, the ground ore is mixed with water to form a slurry which is then transferred to a "conditioner" in which surfactant is added to the slurry in order to alter the hydrophobicity of the solids. In this regard, the desired mineral to be recovered, i.e., the target material, generally needs to be rendered hydrophobic by the addition of a surfactant and depending on the type of surfactant chosen, various minerals may be selectively rendered hydrophobic in order to recover only the desired minerals by froth flotation. In order to recover the desired minerals, the "conditioned" slurry that contains a mixture of hydrophobic and hydrophilic particles is then introduced to tanks known as flotation cells that are aerated to produce bubbles to which the hydrophobic target material attaches and therefore rises to the surface, forming a froth. The mineral laden froth is then removed from the flotation cell, producing a concentrate of the target mineral. A stable froth is essential for the efficient recovery of valuable minerals and frothing agents or "frothers" are typically added to flotation systems in order to enhance and maintain froth stability.

Stage-wise liberation and flotation is required in order to minimize the required energy input during comminution and hence the processing costs. In this regard, the aim is to recover as much of the valuable course material as possible during an initial flotation step (i.e. Roughing) in order to avoid grinding the entire excavated ore to finer recoverable material. As the rougher concentrate produced during the Roughing stage is of low quality, it must usually be subjected to further processing in one or more Cleaner cells or Scavenger cells.

In the Cleaner cells, the rougher concentrate is subjected to a further flotation stage in order to separate any undesirable material previously recovered as part of the Rougher flotation stage. The aim of the Cleaning flotation stage is to produce a concentrate that is the highest quality possible and accordingly, the product from the Cleaning flotation stage is referred to as the "cleaner concentrate" or the "final concentrate".

In addition to, or instead of, progressing the rougher concentrate to a Cleaning flotation stage, the rougher concentrate may be subjected to further grinding (usually called re-grinding) to achieve complete liberation of the valuable minerals. Due to the lower mass of the rougher concentrate as compared with the original excavated ore, less energy is required than would otherwise be necessary if the whole excavated ore were re-ground. Following re-grinding, the rougher concentrate may then be subjected to a Cleaner flotation stage (as previously described), or a Scavenger flotation stage with the aim of recovering any target minerals that were not recovered during the initial Roughing flotation stage. The Scavenging stage may require alteration of the flotation conditions to ensure maximum mineral recovery, or further grinding may be required in order to provide further liberation followed by a further flotation and recovery step.

During each stage of flotation, the minerals that do not float in the froth are referred to as the flotation tailings. If appreciable in quality and amount, these tailings may also be subjected to further stages of flotation to recover any valuable particles that did not float during previous flotation stages. The final tailings after scavenging are normally discarded for disposal as mine fill or transported to a tailings disposal facility for long-term storage.

A typical froth flotation system contains many variables related to the equipment design, chemistry and operation of the system. Some equipment considerations include choice of cell type, slurry agitation means, aeration means, cell configuration and control. Some chemistry considerations include surfactant type and dosing in addition to frother type and dosing and system pH. Some operational considerations include water and air feed rate, mineralogy, particle size, system temperature and slurry (or suspended solids) density.

It will be appreciated that careful choice and control of such variables is required in order to ensure high mineral recovery and processing efficiency. Further, any deviations from optimal conditions can lead to a dramatic decrease in mineral recovery, process efficiency and ultimately process profitability and economic viability.

One of the critical operational variables in a froth flotation system is the slurry (or suspended solids) density. Currently, the suspended solids density of a slurry is generally measured with the use of a nuclear density gauge that is externally fixed to the pipe through which slurry (crushed ore and water) is fed into the conditioner in which surfactant dosing occurs. The amount of surfactant added to the slurry is related to the suspended solids concentration of the slurry in the conditioner feed pipe. Since solids (other than the target minerals that are desired to be recovered) also exist in the slurry entering the conditioner through the feed pipe to which the nuclear density gauge is fixed, such an arrangement tends to overestimate the amount of surfactant required. Overdosing the system with surfactant not only results in a wastage of surfactant, but also affects froth quality and may result in inefficient mineral recovery and lower recovery yields.

Additionally, the suspended solids concentration of the slurry in the feed entry pipe to the conditioner can vary from 20% (w/v) to 65% (w/v) due to variations in the extracted ore from the mine-site and dynamic variations of this magnitude can lead to "sanding" of the particles. Sanding refers to the loss of particles due to their "dropping out" of the froth suspension when the concentration of suspended solids increases above a level that is able to be agitated and therefore kept in suspension, by, for example, a fixed speed agitator.

Current efforts to increase the accuracy associated with measuring the concentration of the valuable material to be recovered within froth flotation systems involves the use of a "bottle test" in which a sample of the conditioned slurry in the flotation cell is manually taken in order to determine the density of the suspended solids. It will be appreciated that manual sampling is a labor intensive and time-consuming process and is also not able to adequately monitor dynamic system changes thereby reducing the accuracy and usefulness of such measurements.

Another problem associated with measurement of the suspended solids concentration using conventional density gauges is that slurries are not only made up of solid particles, but also include suspended gas bubbles as a result of aeration of the slurry during the froth flotation process. Such gas bubbles often interfere with the currently used density measurement arrangements of the suspended solids within the slurry mixture.

Yet another problem associated with measurement of the concentration of suspended solids of slurries using conventional density gauges is that scale can often accumulate on the surface of the gauge thereby requiring frequent cleaning of the equipment that may cause the measurement system to be unavailable and/or loss of process efficiency.

Accordingly, there is a need for a sampling system and method that is able to dynamically track changes in the concentration of suspended solids of slurries such as those that exist in froth flotation systems. Further, there is a need for a control system operable to dynamically track changes in the concentration of suspended solids in slurries and adjust operating parameters of a mineral processing system accordingly.

The present invention seeks to address at least one or more of the above disadvantages associated with conventional systems and methods of measuring the concentration of suspended solids in slurries.

The reference to any prior art in this specification is not, and should not be taken as, an acknowledgement or any suggestion, that the prior art forms part of the common general knowledge.

SUMMARY OF THE INVENTION

In one aspect, the present invention provides a system configured to determine the concentration of a target component in a mixture, the system including at least one acoustic transducer located within the mixture, a controller generating a signal for the at least one acoustic transducer that's generating an acoustic signal in the mixture and transmitting same toward the target component within the mixture, wherein the acoustic signal is generated with a known power level, and a processor for measuring change in the power level of the at least one acoustic transducer as the acoustic signal is transmitted through the mixture, wherein the magnitude of the change in signal power determines the concentration of the target component in the mixture.

In another aspect, the present invention provides a control system configured to determine the concentration of a target component within a mixture, the system including an apparatus having at least one acoustic transducer located within the mixture, a controller for generating an input signal for the at least one transducer thus generating an acoustic signal in the mixture and transmitting same for transmission towards the target component within the mixture, wherein the acoustic signal is generated at a known and fixed power level, and a processor for measuring a change in the power level of the acoustic transducers as the acoustic signal is transmitted through the mixture wherein the magnitude of the change in power level is used to determine the concentration of the target component in the mixture, wherein the apparatus generates a control signal representative of the concentration of the target component, said control signal used to control one or more additional controllers.

In another aspect, the present invention provides a method to determine the concentration of a target component in a mixture, the method including the steps of generating a signal for at least one acoustic transducer, thus generating an acoustic signal and controlling the power of the acoustic signal, measuring any change in the power of the at least one acoustic signal as the acoustic signal is transmitted through the mixture; wherein the detection of a change in the power of at least one acoustic signal is indicative of the presence of the target component in the mixture, and wherein the magnitude of change in the power of the at least one acoustic signal determines the concentration of the target component in the mixture.

SUMMARY OF EMBODIMENT(S) OF THE INVENTION

It will be appreciated that in embodiments, in order to determine the concentration of the target component within a mixture, the power of the acoustic signal is initially correlated against varying and known suspended solids concentrations within a particular flotation process. It will also be appreciated that the change in power is measured against a baseline measurement conducted in a clear aqueous medium. Accordingly, the change in power of the acoustic signal correlates with varying concentration of suspended solids for a particular flotation process and as such, the correlation may be used to determine and identify various target component concentrations in the mixture during operation of the flotation process.

In embodiments, the system includes two or more transducers located in an array.

In other embodiments, the array is a linear array of transducers formed from a single line of transducers although it will be understood that other configurations of transducers within the array may be used.

In another embodiment, the at least one array includes a plurality of arrays connectable with each other to form an extended array.

It will be appreciated that any number of transducers may be used. However, in an embodiment, the array includes at least three transducers located in a single line to form a linear array.

In embodiments where more than one transducer is included in an array, the measured power of the acoustic signal may be the average power of the plurality of transducers.

In an embodiment, the controller is programmed to control two or more transducers to generate an acoustic signal, wherein the power of the two or more acoustic signals is the calculated average power of the two or more signals. It will be understood that in this embodiment, the measured change in the power level of the two or more acoustic signals occurs as the acoustic signal moves through the mixture comprising the target component, and is the average change in the power of the two or more acoustic signals.

In an embodiment, the controller is programmed to generate a signal for the at least one transducer upon the input of an external command which generates an acoustic signal for transmission into the mixture.

In an embodiment, the controller is programmed to control the at least one signal to generate a periodic acoustic signal.

In another embodiment, the controller is programmed to control the at least one signal to generate a continuous acoustic signal.

In an embodiment, the system utilizes high powered, low to medium frequency (approx. 20 kHz), transducers that are impedance matched to operate as sonar transducers within liquid media. The transducers may have variable drive levels that are capable of manual operation to produce different power outputs from the operating diaphragms.

In an embodiment in which three transducers are adopted in a linear array, the power output of the three transducers is averaged and a 4-20 ma analogue output is provided that is proportional to the change in power output of the transducers.

In embodiments in which a solids concentration profile of the entire tank is required, up to 80 individual transducers may be used, with each individual transducer identified and the output from each transducer transmitted, by a communication protocol, to a control system.

The system and method of the invention enables measuring the concentration of suspended solids over a wide concentration range and in an embodiment, the system is configured to measure suspended solids concentration ranging from about 20% to about 65% (w/v).

When producing power outputs greater than 100 watts, the transducers require cooling.

When operating the one or more transducers at a fixed voltage level and frequency in an aqueous medium, it is observed that the transducer power output as measured in clean water increases, proportionally, with an increase in the amount of solids within the aqueous medium immediately in front of the transducer operating diaphragm. Without being bound by theory, it is considered that the observed change (increase) in power level required to operate the transducers with a fixed voltage and frequency is caused by "acoustic reflective impedance". "Acoustic reflective impedance" is the ratio of acoustic pressure to acoustic volume flow and it is postulated that acoustic reflective impedance changes in accordance with the concentration of suspended solids within a liquid medium.

It is further postulated that when an acoustic signal is generated and transmitted through a mixture and encounters the surface of any solid particles suspended in the liquid mixture, the signal is reflected from the solid particles back towards the operating diaphragm of the transducer(s). Accordingly, as the solids concentration within a liquid medium increases, a proportional change in acoustic reflective impedance and a proportional change in transducer power output is observed.

In an embodiment, the liquid layer is agitated and aerated in the flotation tank, such that gas bubbles ascend through the liquid layer to produce a froth layer. Whilst the acoustic impedance changes due to any increase in the suspended solids concentration and the required transducer power output increases, it has been noted that the acoustic impedance and transducer power output remains substantially unaffected by the presence of gas bubbles within the liquid medium. It is thought that this may be due to the fact that the gas bubbles, unlike solid particles, are able to be compressed and disperse on contact with the acoustic signal and therefore do not contribute to the acoustic impedance and reflection of the acoustic signal back to the transducer operating diaphragm.

Accordingly, the system and method of the present invention may be used in various embodiments to determine the suspended solids concentration within a liquid medium even in the presence of gas bubbles that are produced as a result of aeration of the medium during the froth flotation process.

The transducers may also be controlled to produce high power outputs that assist in eliminating accumulation of scale from the operating diaphragm immersed within the mixture. In embodiments, the controller is further adapted to control each transducer to operate in a cleaning mode for generating a signal which forms cavitation in the mixture, such that, if one or more substances within the mixture has accumulated at or near the transducer, the cavitation removes at least some of the accumulation from on and/or near the transducer. In this regard, the pulse amplitude of the signal is sufficient to cause a phenomenon called "rarefaction", which in turn causes cavitation. The cavitation may result in any accumulated substance dissolving, if it is a substance soluble in the slurry medium (usually water), and if the cavitation energy is sufficient to effect such dissolving. The cavitation may result in an accumulated substance being displaced, if it is not soluble in the slurry medium, for example, oil, grease and scale.

It will be appreciated that the system and method of the invention may be used to determine the concentration of a target component within a mixture, for example, the concentration of suspended solids within a slurry. In embodiments, the slurry is contained within a flotation vessel in which valuable material (ore) is separated from waste material or gangue.

In another aspect, the present invention provides a system configured to determine the suspended solids concentration of a slurry, the system including at least one acoustic transducer located within the slurry, a controller generating an input signal for the at least one transducer thus generating an acoustic signal in the mixture and transmitting same for transmission towards the suspended solids within the mixture, wherein the acoustic signal is generated at a known and fixed power level, and a processor for measuring a change in the power level of the acoustic transducers as the acoustic signal is transmitted through the slurry wherein the magnitude of the change in power level is used to determine the concentration of the suspended solids in the slurry.

In yet another aspect, the present invention provides a method of determining the suspended solids concentration of a slurry, the method including the steps of generating in at least one transducer, an acoustic signal at a known and fixed power level, measuring a change in the power level of the one or more acoustic transducers as the acoustic signal is transmitted through the slurry, wherein the detection of a change in the power level of the one or more transducers is used to indicate the presence of suspended solids in the slurry, and wherein the magnitude of the change in the power level of the one or more transducers is used to determine the suspended solids concentration of the slurry.

In an embodiment, the slurry is contained within a froth flotation tank and includes a bottom-most liquid layer, an intermediate froth layer and a top-most gaseous layer wherein the one or more transducers of the array are submerged within the bottom-most liquid layer of the slurry. It will be appreciated that one of the benefits of the presently described system and method of the invention is that the concentration of suspended solids within the slurry liquid layer may be continuously monitored and measured with sufficient accuracy and without the need for any manual handling or system downtime during suspended solids analysis and/or equipment maintenance. Accordingly, a system operator may be located geographically remote from the tank and still ensure that the process is running optimally and at peak efficiency.

In other embodiments it is contemplated that the system and method can be arranged so as to give feedback of the suspended solids concentration in the liquid layer of the flotation tank directly to an automated input means. In this regard, the processor may be configured to send information to a controller for controlling, for example, dart valves, which regulate flow of liquid into the flotation tank; agitators (including impellers located in the tank); or; aerators (including aeration tubes connected to the tank), or any other devices for regulating or controlling the operation of the tank. In this regard, the flotation tank can be made autonomous or semi-autonomous.

In an embodiment, the liquid layer is a slurry or pulp containing layer of at least one mineral. The flotation tank could be used for processing various products from mining and other geological extraction methods, such as: copper, molybdenum, gold, silver, lead, nickel, iron ore, coal, potash, oil and oil sands, gypsum and many other substances. However, it is also contemplated that the system and method of the invention could be applied to other processes outside of minerals processing, such as food or beverage production or other types of manufacturing where measurement of the suspended solids concentration of a slurry by acoustic measurement can provide an advantage over other types of measurement. It is important to note that the system and method of the present invention may be used to determine the concentration of suspended solids in a liquid irrespective of whether or not the liquid is subjected to aeration. However, it is particularly advantageous that the system and method of the present invention is capable of determining the concentration of suspended solids in a liquid that is subject to varying levels of aeration without any noticeable effect upon the determination of the concentration of solids in the liquid. It is postulated that the presence of air bubbles in a liquid medium does not affect the result of the determination since the air bubble does not present any acoustic reflective impedance and hence does not cause any significant change to the power required to generate and transmit the acoustic signal through the mixture.

Embodiments of the invention will now be described in further detail with reference to the accompanying figures.

DETAILED DESCRIPTION OF EMBODIMENT(S) OF THE INVENTION

Figure 1:
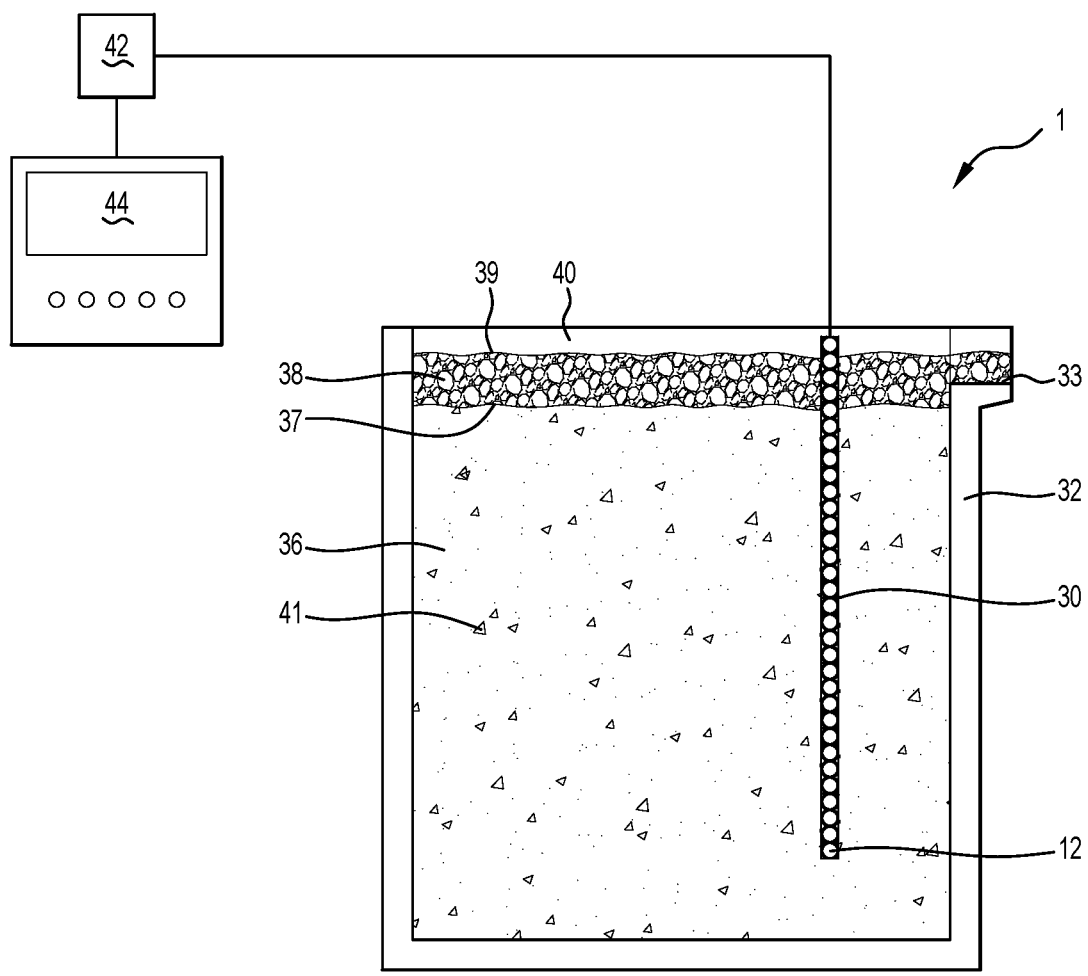
FIG. 1 is a cross-sectional view of a vessel and system in accordance with an embodiment of the present invention.

The system according to any embodiment of the invention and as shown in FIG. 1 will now be described. This figure shows flotation tank 32 with liquid layer 36, a froth layer 38 and an air layer 40 with interfaces 37, 39 therebetween. Liquid layer 36 also has solids 41 suspended therethrough.

As is further shown in FIG. 1, extended array 30 is submerged within liquid layer 36 comprising suspended solids 41. FIG. 1 further shows controller 42 for controlling the operation of extended array 30. Also shown is monitoring apparatus 44 (which in embodiments may also include the processor for processing the power output from the transducer array). It will be understood that the monitor may be geographically proximal to the flotation tank, or remote.

Figure 2:
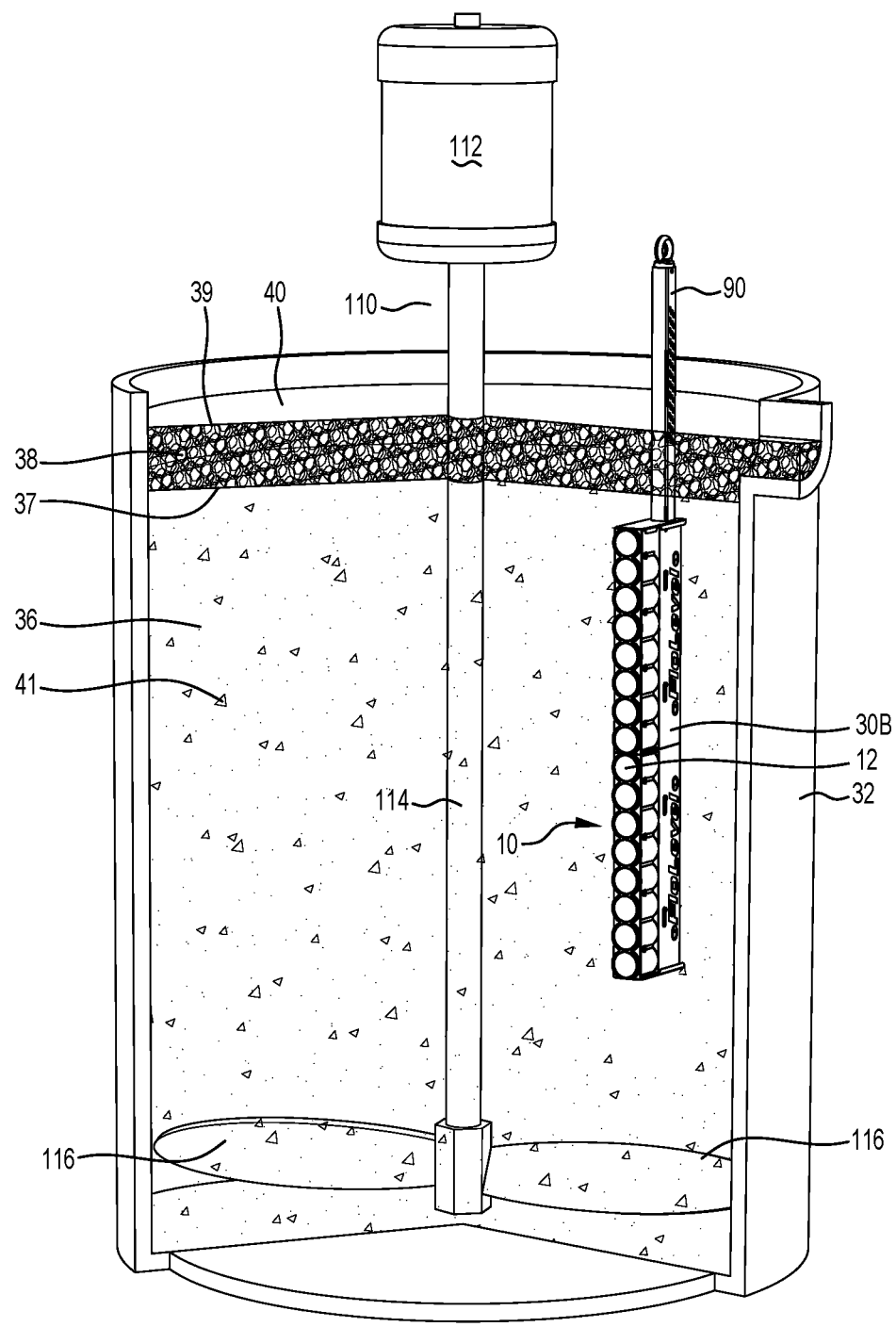
FIG. 2 is a partially cut away perspective view of a flotation tank with transducer array in accordance with an embodiment of the invention.

With reference to FIG. 2, further features of flotation tank 32 is shown, this time without the controller, processor or monitoring apparatus shown in FIG. 1. As shown in FIG. 2, tank 32 also has an aerator 110, including a motor 112, a shaft 114 and blades 116. Tank 32 also includes a submerged array of an extended array 30B of transducers 12 within liquid layer 36 which are used to conduct online sampling of the suspended solids 41 concentration within liquid layer 36. In this embodiment, extended array 30B includes two component arrays 10 each with eight transducers 12 arranged in a single line to form an extended array of a linear configuration. The array 30B is substantially vertically mounted in tank 32 and therefore spans the height of the liquid layer 36 so as to obtain a measurement of the suspended solids substantially throughout the entire liquid layer 36.

Whilst the extended array 30B shown in FIG. 2 has 16 transducers in total (across the two array components 10 each with eight transducers 12 within the extended array 30B), it will be appreciated that any number of transducers may be adopted in the system of the invention ranging from a system with a single transducer to a system having an array of about 80 transducers for very large tanks where a total solids concentration profile of the entire flotation vessel is required.

Figure 3:
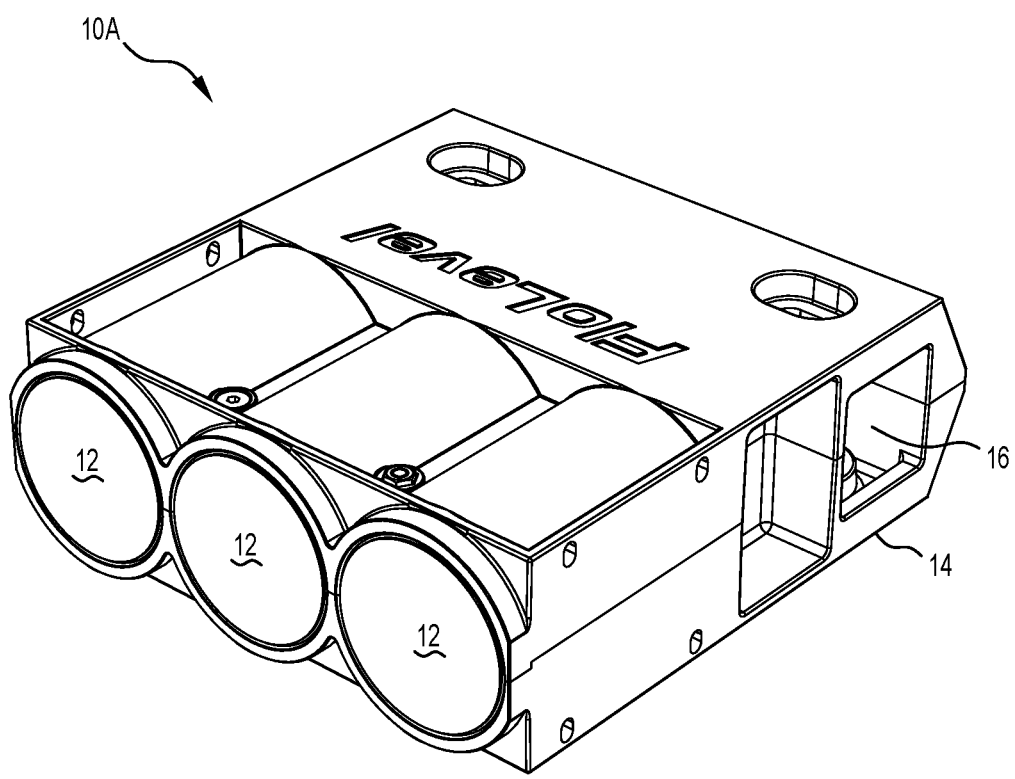
FIG. 3 is a perspective view of an alternative embodiment of an array having three (3) transducers in a linear configuration.

In an embodiment, the system includes three transducers 12 located in an array 10A as shown in FIG. 3. In certain embodiments, the measured power output of the transducers is the calculated average of the power output across the plurality of transducers and in the embodiment shown in FIG. 3, the measured power output is the average power output across all three transducers 12. FIG. 3 also shows transducers 12 arranged in housing 14.

Figure 4:
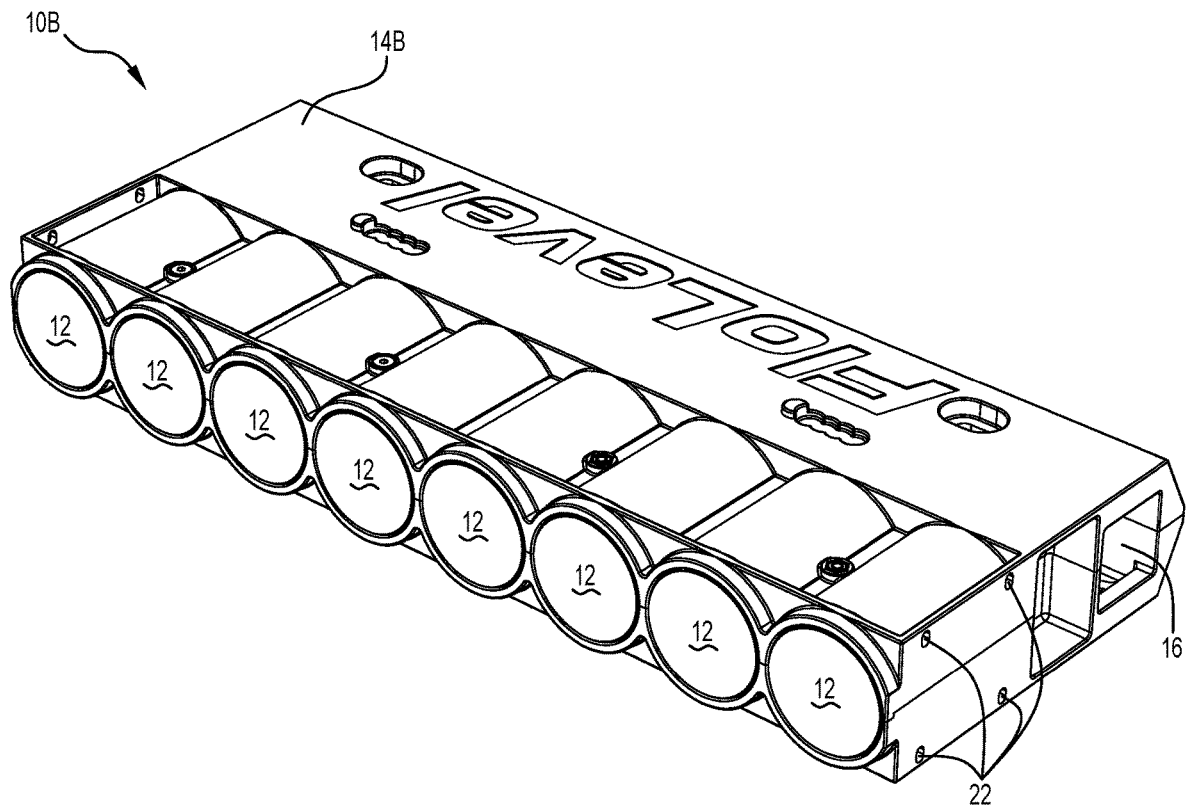
FIG. 4 is a perspective view of a single array with eight (8) transducers in an array according to an alternative embodiment of the invention.

In another embodiment shown in FIG. 4, the system includes transducer array 10B including eight transducers 12, mounted in the transducer array housing 14B in a single line, and closely spaced (or abutting each other). The transducer array 10B may form an array component in an extended array 30B (see FIG. 2).

Figure 5:
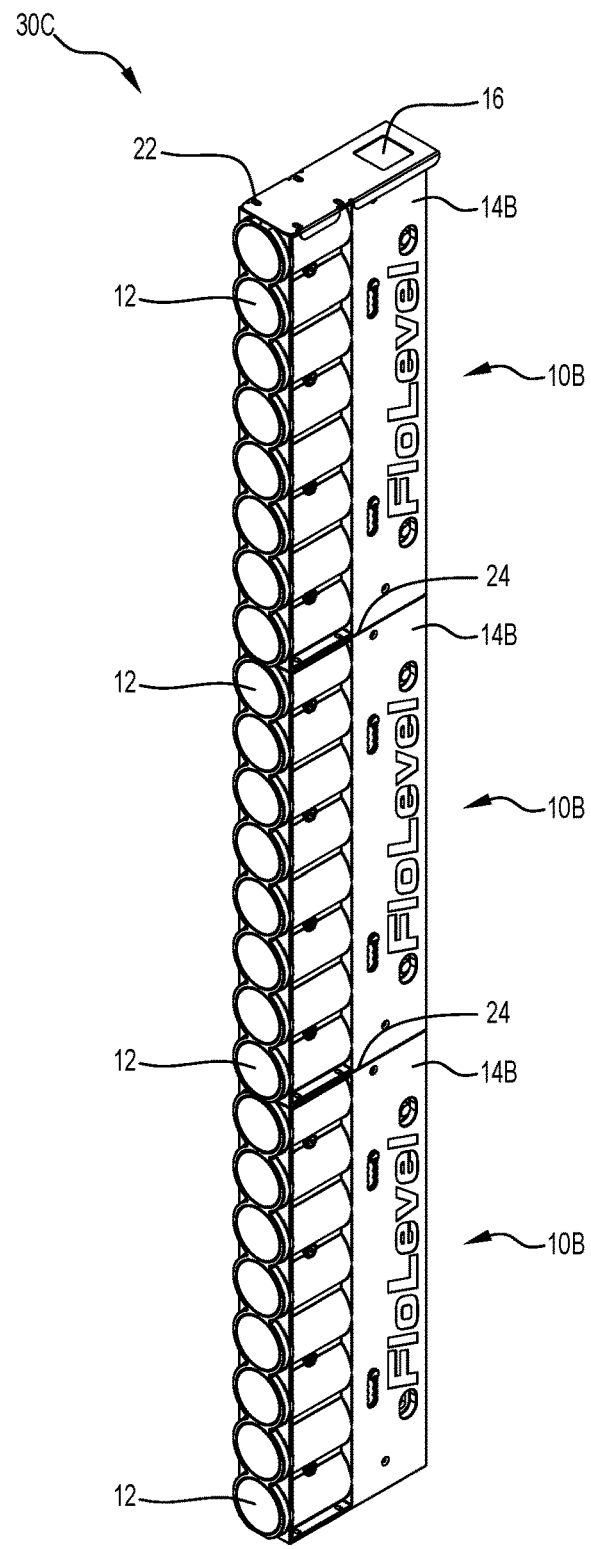
FIG. 5 is a perspective view of an extended array of a plurality of arrays, in accordance with yet another embodiment of the invention.

FIG. 5 shows an embodiment wherein four transducer arrays 10B form transducer array components, and are connected together so as to form an extended array 30C. The array components 10B are connected together via bolt holes 22 and connecting bolts 24. However, it will be understood that there may be other means of connecting array components 10B together so as to form the extended array 30C. A bus (not shown) may data connect the array components together, so that data is transmitted between the arrays, the transducers of the arrays, the controller and the processor. However, an efficient design may include only one controller and one processor for the system and method of the invention.

In embodiments, the aerator can be controlled by the system processor so as to set the speed of rotation, and thus the amount of aeration. This can control the amount of froth production and alter the suspended solids concentration within the slurry. In some other types of flotation tank, the aeration is provided via aeration tubes in which air is pumped into the liquid. These aeration tubes can also be controlled by the processor to regulate aeration in the tank.

Referring once again to FIG. 1, froth layer 38 containing the mineral concentrate may be periodically removed from tank 32 through pipe 33 into a collection vessel such as a launder (not shown) where further processing of the mineral concentrate occurs. In embodiments, system 1, through the system processor, may also control the rate at which the mineral concentrate is removed from tank 32.

The feed rate of water and/or mineral material to be processed into tank 32 may also be controlled by the system processor. It will be appreciated that in order to achieve optimum process efficiency and operation, the suspended solids concentration within a flotation tank is typically maintained at 30-40% (w/v) suspended solids. The ability to conduct continuous online sampling of the suspended solids concentration within the tank therefore allows continuous and rapid adjustment of the process conditions. For example, the feed rate of water and/or mineral material into the tank may be continuously adjusted in response to the online sample readings of the suspended solids concentration using system 1, so as to maintain the suspended solids concentration within tank 32 within an acceptable concentration range.

In embodiments, transducers may be Commercial Off-The-Shelf (COTS) type products. Often such transducers have their own outer protection and/or casing, which may be suitable for mining applications. The system and method may provide additional protection by using an outer casing or housing, which also provides protection for any electronics, along with providing extra protection for the transducers. In some embodiments, spacers in the outer casing/housing may be filled with a substance, such as an epoxy resin, for reinforcement of the casing/housing in the high pressure conditions of the flotation cell/flotation tank.

Where it is desired to provide an extended array, the array components (transducer arrays) are connected with each other so as to form an extended longitudinal array. In such an embodiment, there may be provided a bus connection between the array components (array modules). It will be understood that any such bus connections, along with all other electronic components situated in the flotation cell/flotation tank, must be protected against the conditions produced by substances in the flotation cell/flotation tank, and so must be enclosed in the array components, and must also be enclosed when the array components are connected together to form the extended array.

In an embodiment, the system may include a housing for the array. The housing may be made from glass-reinforced propylene or ABS. It has been found that propylene assists in avoiding scale build-up, and is therefore easier for cleaning of the housing.

In an embodiment, the transducer array, or extended array, may be pulsed so that all transducers in the array produce cavitation for self-cleaning at the same time. This facility may be useful for inter-operation cleaning purposes.

It will be appreciated that improved efficiencies will be gained through the ability to continuously adjust and control the aeration rate in response to the measured concentration of suspended solids in a mineral flotation process. Such automatic and continuous control avoids overdosing with reagent which not only improves the froth structure, but also improves process economics.

The system and method according to embodiments of the invention will now be further described with reference to the following experimental tests conducted to demonstrate the principle of operation of the system and method according to embodiments of the invention.

Experimental Test 1—Measurement of Change in Acoustic Reflective Impedance (Transducer Power Output) with Change in Surface Area of Perforated Plates Simulating Varying Target Densities Test 1(a)—Small Scale Test in the Absence of Medium Aeration In order to demonstrate the change in acoustic impedance (transducer power output) with varying target densities, perforated plates of varying hole sizes (and hence varying surface areas) were adopted and placed in front of the operating diaphragm of transducers located within a transducer array immersed in an aqueous medium.

It will be appreciated that the perforated plates with varying hole sizes were designed to simulate varying target densities as would be observed in situations where the system of the invention is used to determine the concentration (i.e., density) of solids suspended within an aqueous medium. A practical example of where such a system would find use is in froth flotation systems that are generally used in minerals processing, wherein the slurry is a dynamic system in which the suspended solids concentration (i.e., solids density) changes with time.

The test was undertaken in a tank of dimensions H: 600 cm×W: 500 cm×D: 400 cm which was filled with water and fitted with a linear array of three transducers (as shown in, for example, FIG. 2). No aeration of the tank was performed.

The acoustic transducers were calibrated to 90W in clean water by adjusting the drive voltage level. Each test run was performed with a different perforated plate having a specific hole-size (and hence surface area/simulated solid density).

Each plate was immersed in water and placed in front of the operating diaphragm of the acoustic transducers. In each test run, it was ensured that the perforated plate completely covered the operating diaphragm of each transducer.

The following results were observed:

| Plate no. | % Surface area Closed | % Surface area Open | Measured change in average Power (W) |
|---|---|---|---|
| 1 | 23 | 77 | 116 |
| 2 | 42 | 58 | 133 |
| 3 | 60 | 40 | 142 |
| 4 | 80 | 20 | 160 |

As is demonstrated by the above results, an increase in transducer power output is observed as the % surface area of the perforated plate (i.e., simulated solids density) increases.

Test 1(b)—Small Scale Test in the Presence of Medium Aeration

Test 1(a) was repeated, this time, in the presence of aeration in order to determine the effect, if any, of the presence of gas bubbles on the power output level of the transducers with varying solids density. The aeration flow rate was initially lowered to the lowest possible flowrate and then progressively raised to the maximum flowrate.

Each perforated plate (1 to 4—see Test 1(a)) was tested at each aeration level and similar results were obtained to those obtained in Test 1(a) with a ±1% change in average power output (W) observed from minimum aeration flowrate to maximum aeration flowrate for all plates 1 to 4. This demonstrates that the system and method of the present invention is independent of, or unaffected by, the presence of gas bubbles during aeration of the medium.

Experimental Test 2—Measurement of Change in Acoustic Reflective Impedance (Transducer Power Output) with Change in Suspended Solids Density (Soil) within an Aqueous Medium The test was undertaken in an aeration tank of dimensions 3 m high and 1.5 m diameter which was filled with water and fitted with a linear array of three transducers. Medium aeration of the tank was performed. Aeration was performed using sintered filters that produced bubbles concentration of <3 mm. No air flow rates were measured.

The acoustic transducers were calibrated to 90 Watts in clean water by adjusting the drive voltage level and with rates of aeration varying from minimum to maximum aeration, similar results with the perforated plates were obtained as compared with Experimental Test 1.

As solids were gradually introduced into the liquid in the tank, changes to the power supplied to the transducers was measured and a similar correlation of the solid material in suspension as compared with the input power to the transducers operating at a fixed and known voltage and frequency.

Solids (soil particles) progressively settle out of the suspension over time, the average input power to operate the transducers decreased thereby clearly providing further confirmation of a correlation between suspended solids density and transducer average power (W).

Experimental Test 3: Measurement of Change in Power Level with Change in Suspended Solids Density Testing was performed in a vessel of dimensions (600×400×260 mm) using the apparatus of the present invention including three standard 20 kHz transducers.

Testing was performed in 25 liters of water using a suspended solids concentration ranging between 0% to 46% (w/v) which covers the range of suspended solids concentration typically observed in industrial floatation cells (i.e., about 20% to 40% (w/v) with an optimal solids loading of about 30% to about 40% (w/v)).

Uniform mixing of the contents was maintained throughout the vessel with the use of 2 high speed agitators controlled at an appropriate RPM in order to maintain the solids in suspension over the concentration ranged tested.

Diatomaceous earth (food grade, 200 microns) was adopted as the suspended solids during testing (refer to Test 3(a) results). Further testing was conducted using food grade diatomaceous earth at 500 microns particle size (refer to Test 3(b) results).

Food grade diatomaceous earth (200 and 500 microns) was chosen for testing as this material is free of impurities and its behaviour and characteristics approximate that of copper, gold and nickel particles that are typically observed in floatation cells of industrial mining processes. The selected particle sizes also cover the particle size range typically observed in floatation cells of industrial mining processes.

Test 3(a) with Food Grade Diatomaceous Earth (200 Micron)

Whilst agitating the vessel contents at a 0% (w/v) solids in suspension, the acoustic transducers were calibrated at an initial set point of 82 watts.

One percent (250 g) increments of diatomaceous earth was tested by weighing each batch and measuring the average power output of three sample pulses of the transducers. The following results were observed:

| Solids % (w/v) | Measured Watt (Average of three pulses) |
|---|---|
| 0 | 82 |
| 1 | 93 |
| 2 | 96 |
| 3 | 98 |
| 4 | 99 |
| 5 | 101 |
| 6 | 103 |
| 7 | 104 |
| 8 | 105 |
| 9 | 107 |
| 10 | 110 |

Test 3(b) with Food Grade Diatomaceous Earth (200 Micron)

Further testing was conducted in which the suspended solids concentration within the vessel was progressively increased by 4% (w/v) increments (1000 g).

Diatomaceous earth (food grade, 500 microns) was adopted as the suspended solids during this further testing. All other parameters were as for Test 3(a).

The following results were observed with this further test (Test 3(b)):

| Solids % (w/v) | Measured Watts (Average of three pulses) |
|---|---|
| 14 | 117 |
| 18 | 126 |
| 22 | 133 |
| 26 | 144 |
| 30 | 152 |
| 34 | 159 |

-continued

| Solids % (w/v) | Measured Watts (Average of three pulses) |
|---|---|
| 38 | 167 |
| 42 | 171 |
| 46 | 176 |

Accordingly, as the results of Tests 3(a) and 3(b) demonstrate, there is an observable and repeatable trend between the suspended solids concentration and the measured power (W) upon transmission of an acoustic, fixed frequency, acoustic pulse, through the slurry. In particular, as the suspended solids concentration of the slurry increases, a corresponding increase in the measured power (W) is observed.

It will be appreciated that this method of measurement and the observable trend between suspended solids concentration and measured power (W) output may provide mining companies and the like with advantages in controlling their floatation cell operation, or any vessel in which the suspended solids concentration is to be measured.

Accordingly, the system and method of the invention is not only able to provide results that are indicative of increased suspended solids concentration within a floatation vessel (or the like), but is also a self-cleaning system due to the ability to induce cavitation in the mixture (slurry) which is desirable from a processing and operating efficiency perspective.

In embodiments, the system and method of the invention are substantially unaffected by the presence of gaseous medium within the slurry.

In embodiments, system and method enables continuous sampling of the suspended solids and allows for automatic feedback to the reagent dosing tank for both water addition/subtraction to provide a constant desired average solids concentration (30-40% w/v).

Embodiments of the system are suited for use in the harsh conditions that typically exist in mineral processing and is also suited for use in all Sulphides minerals in the flotation cell process.

Any reference to prior art in this specification is not, and should not be taken as, an acknowledgement, or any suggestion, that the prior art forms part of the common general knowledge.

It will be appreciated by persons skilled in the relevant field of technology that numerous variations and/or modifications may be made to the invention as detailed in the embodiments without departing from the spirit or scope of the invention as broadly described. The present embodiments are therefore to be considered in all aspects as illustrative and not restrictive.

What is claimed is:

1. An apparatus for dynamically determining the concentration of a target component in an aerated mixture, the apparatus comprising:
   at least one acoustic transducer located within the aerated mixture;
   a controller generating an acoustic signal for the at least one acoustic transducer operating at a fixed voltage and frequency and transmitting the acoustic signal toward the target component within the aerated mixture, wherein the acoustic signal is generated with a known power level; and
   a processor for measuring change in the power level of the at least one acoustic transducer that is required to maintain the at least one acoustic transducer at the fixed voltage and frequency as the acoustic signal is transmitted through the aerated mixture, wherein the magnitude of the change in power level of the at least one acoustic transducer determines the concentration of the target component in the aerated mixture.

2. An apparatus according to claim 1 including two or more transducers located in a linear array.

3. An apparatus according to claim 1 including three transducers located in a linear array.

4. An apparatus according to claim 1 where the at least one array includes a plurality of arrays connectable with each other to form an extended array.

5. An apparatus according to claim 1 wherein when two or more transducers are located in the aerated mixture, the measured power level is the average power level of the two or more transducers.

6. An apparatus according to claim 1 wherein the controller is programmed to control two or more transducers to generate the acoustic signal, wherein the power of the two or more acoustic signals is the calculated average power of the two or more acoustic signals.

7. An apparatus according to claim 1 wherein the controller is programmed to generate the acoustic signal for the at least one transducer upon input of an external command which generates the acoustic signal for transmission into the aerated mixture.

8. An apparatus according to claim 1 wherein the controller is programmed to control the acoustic signal to generate a periodic acoustic signal.

9. An apparatus according to claim 1 wherein the controller is programmed to control the acoustic signal to generate a continuous acoustic signal.

10. An apparatus according to claim 1 wherein the apparatus utilizes high powered, low to medium frequency transducers.

11. An apparatus according to claim 1 wherein the target component is suspended solids and the apparatus is configured to measure suspended solids concentration ranging from about 20% to about 65% (w/v).

12. An apparatus according to claim 11 wherein a substantially linear relationship is observed between the suspended solids concentration and the measured power level.

13. An apparatus according to claim 1 wherein the apparatus is used to determine a suspended solids concentration within an aerated mixture, wherein the change in power level is substantially unaffected by the presence of a gaseous medium within the aerated mixture.

14. An apparatus according to claim 1 wherein the controller is adapted to control each transducer to operate in a cleaning mode for generating the acoustic signal which forms cavitation in the mixture.

15. A control system configured to dynamically determine the concentration of a target component within an aerated mixture, the system including an apparatus comprising:
   at least one acoustic transducer located within the aerated mixture;
   a controller for generating an acoustic signal for the at least one transducer operating at a fixed voltage and frequency and transmitting the acoustic signal for transmission towards the target component within the aerated mixture, wherein the acoustic signal is generated at a known and fixed power level, and
   a processor for measuring a change in the power level of the at least one acoustic transducers that is required to maintain the at least one acoustic transducer at the fixed voltage and frequency as the acoustic signal is transmitted through the aerated mixture wherein the magnitude of the change in power level of the at one acoustic transducer determines the concentration of the target component in the aerated mixture;

wherein the apparatus generates a control signal representative of the concentration of the target component, said control signal used to control one or more additional controllers.

16. A method for dynamically determining the concentration of a target component in an aerated mixture, the method comprising the steps of:

generating an acoustic signal for at least one acoustic transducer operating at a fixed voltage and frequency;

measuring change in the power level of the at least one acoustic transducer that is required to maintain the at least one acoustic transducer at the fixed voltage and frequency as the acoustic signal is transmitted through the aerated mixture; wherein the detection of a change in the power level of at least one acoustic transducer is indicative of the presence of the target component in the aerated mixture; and wherein the magnitude of change in the power level of the at least one acoustic transducer determines the concentration of the target component in the aerated mixture.

17. A method according to claim 16 wherein the aerated mixture is contained within a flotation tank that includes a bottom-most liquid layer, an intermediate froth layer and a top-most gaseous layer, wherein the one or more transducers are submerged within the bottom-most liquid layer of the aerated mixture.

18. A method according to claim 16 wherein the aerated mixture is a slurry or pulp containing at least one mineral.

19. A method according to claim 16 wherein the change in power level is substantially unaffected by the presence of gaseous medium within the aerated mixture.

20. A method according to claim 16 wherein a substantially linear relationship is observed between the concentration of the target component in the aerated mixture and the measured power level.

* * * * *